United States Patent

[11] 3,630,558

[72] Inventors John Andreini
 Irvington, N.J.;
 Edwin Harley Borchard; Karl-Heinz Pohl,
 both of Boulder, Colo.; Joseph Anthony
 Puccio, East Brunswick, N.J.
[21] Appl. No. 67,902
[22] Filed Aug. 28, 1970
[45] Patented Dec. 28, 1971
[73] Assignee Bell Telephone Laboratories, Inc.
 Murray Hill, Berkeley Heights, N.J.

[54] QUICK-MOUNTING HARDWARE
 10 Claims, 2 Drawing Figs.
[52] U.S. Cl........................................................ 292/87,
 24/224, 70/451, 292/DIG. 38, 292/DIG. 53
[51] Int. Cl....................................................... E05c 19/06
[50] Field of Search............................................ 292/17, 19,
 76, 87, 91, DIG. 38, DIG. 53, DIG. 30; 24/223,
 224; 70/69, 70, 451; 339/91 R, 128, 198; 248/27,
 314

[56] References Cited
 UNITED STATES PATENTS
 846,678 3/1907 Martinez...................... 24/224
 2,049,869 8/1936 Rohrs........................... 24/224
 FOREIGN PATENTS
 8,124 1911 Great Britain................ 24/224

Primary Examiner—Robert L. Wolfe
Attorneys—R. J. Guenther and Edwin B. Cave

ABSTRACT: Snap-on hardware mounted on a structural component including a wall having an opening and a wedge-shaped boss on each side of the opening. The hardware comprises a pair of spaced flanges joined by a hub, the flanges being spaced apart the same distance as the thickness of the wall at the site of the opening. The hardware is positioned with the hub in the opening and the flanges straddling the wall, and the flanges include fingers that snap behind the wedge-shaped bosses to secure the hardware in place when the hub is positioned within a particular portion of the opening. One flange has a functional element extending therefrom.

3,630,558

INVENTORS
J. ANDREINI
E. H. BORCHARD
K-H. POHL
J. A. PUCCIO

BY
ATTORNEY

QUICK-MOUNTING HARDWARE

FIELD OF THE INVENTION

This invention relates to hardware and, within that field, to components adapted to be mounted on a structural element without the use of fasteners.

BACKGROUND OF THE INVENTION

With the cost of labor becoming an ever increasing factor in the cost of manufacturing cabinet-type structures, it has become increasingly desirable to reduce the amount of time necessary to assemble the many elements that comprise such structures. One area that has not received much attention heretofore is the hardware that is used in each cabinet. This hardware is at present mounted by the use of fasteners which require the threading of a screw into a tapped hole or the threading of a nut onto a bolt. Since each piece of hardware requires at least two fasteners, and since each cabinet structure includes several hinges and at least one latch, the time required to fasten the hardware in place is significant.

SUMMARY OF THE INVENTION

Hardware is herein disclosed that is snapped into place and does not require the use of any fasteners, thereby effecting a substantial reduction in the time required to secure the hardware in place. In an illustrative embodiment, the hardware of this invention is mounted on a structural component including a wall having an opening consisting of an entry portion and a mounting portion extending from the entry portion. One surface of the wall has a wedge-shaped boss on each side of the mounting portion with the edge thereof facing the entry portion.

The hardware itself comprises a pair of spaced flanges joined by a hub. The hub is of a size to occupy the mounting portion of the opening, while the flanges are spaced apart the same distance as the thickness of the wall at the site of the opening. One of the flanges is of a configuration to pass through the entry portion of the opening and includes a pair of opposed fingers that snap behind the wedge-shaped bosses to secure the hardware in place when the hub is moved into the mounting portion of the opening. The other flange has a functional element, such as a latch for a door, extending therefrom.

DETAILED DESCRIPTION OF THE INVENTION

Figure 1:
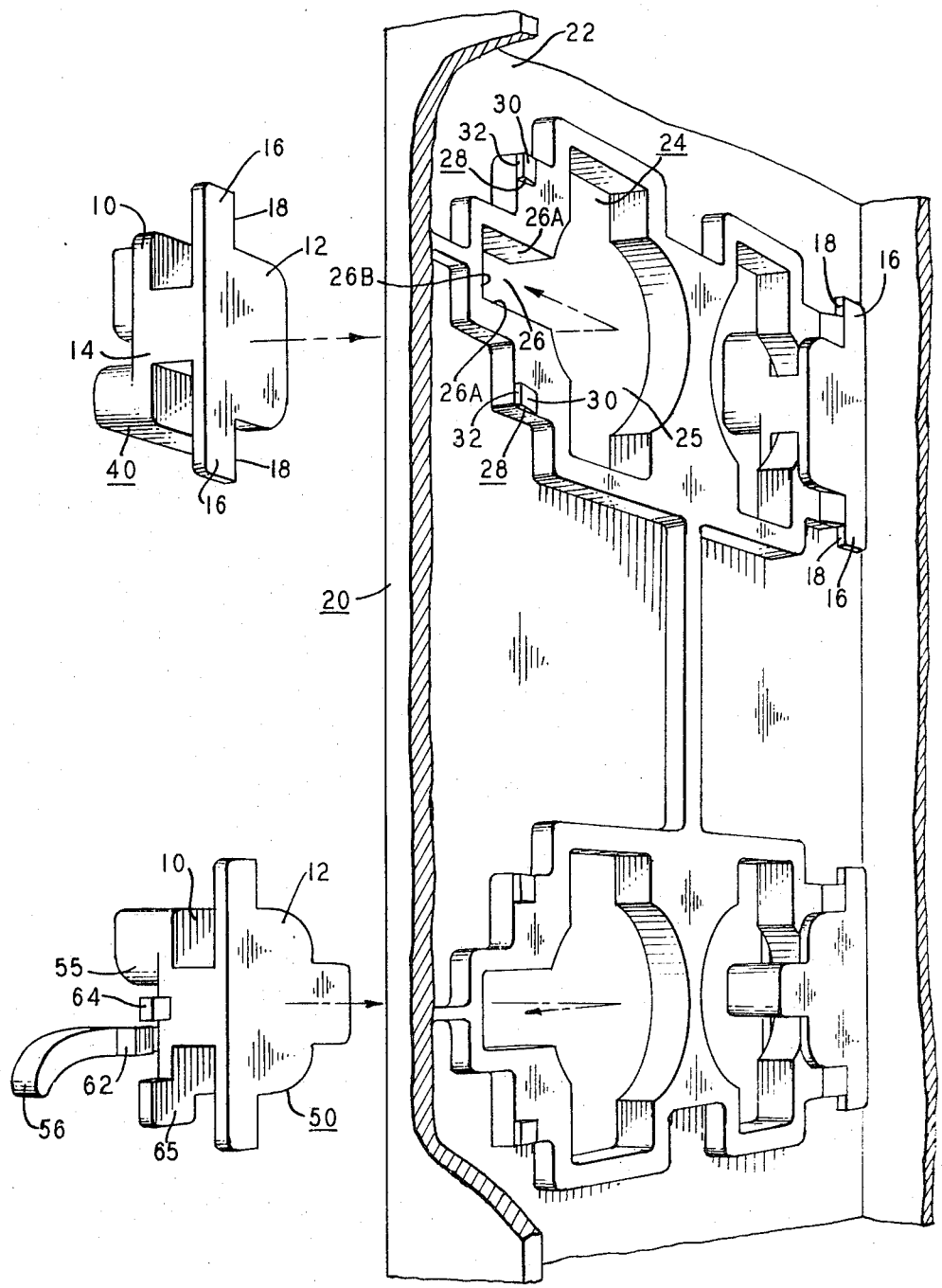
FIG. 1 is a right side perspective view showing two embodiments of the hardware of this invention spaced from and mounted on an associated structural component.
Figure 2:
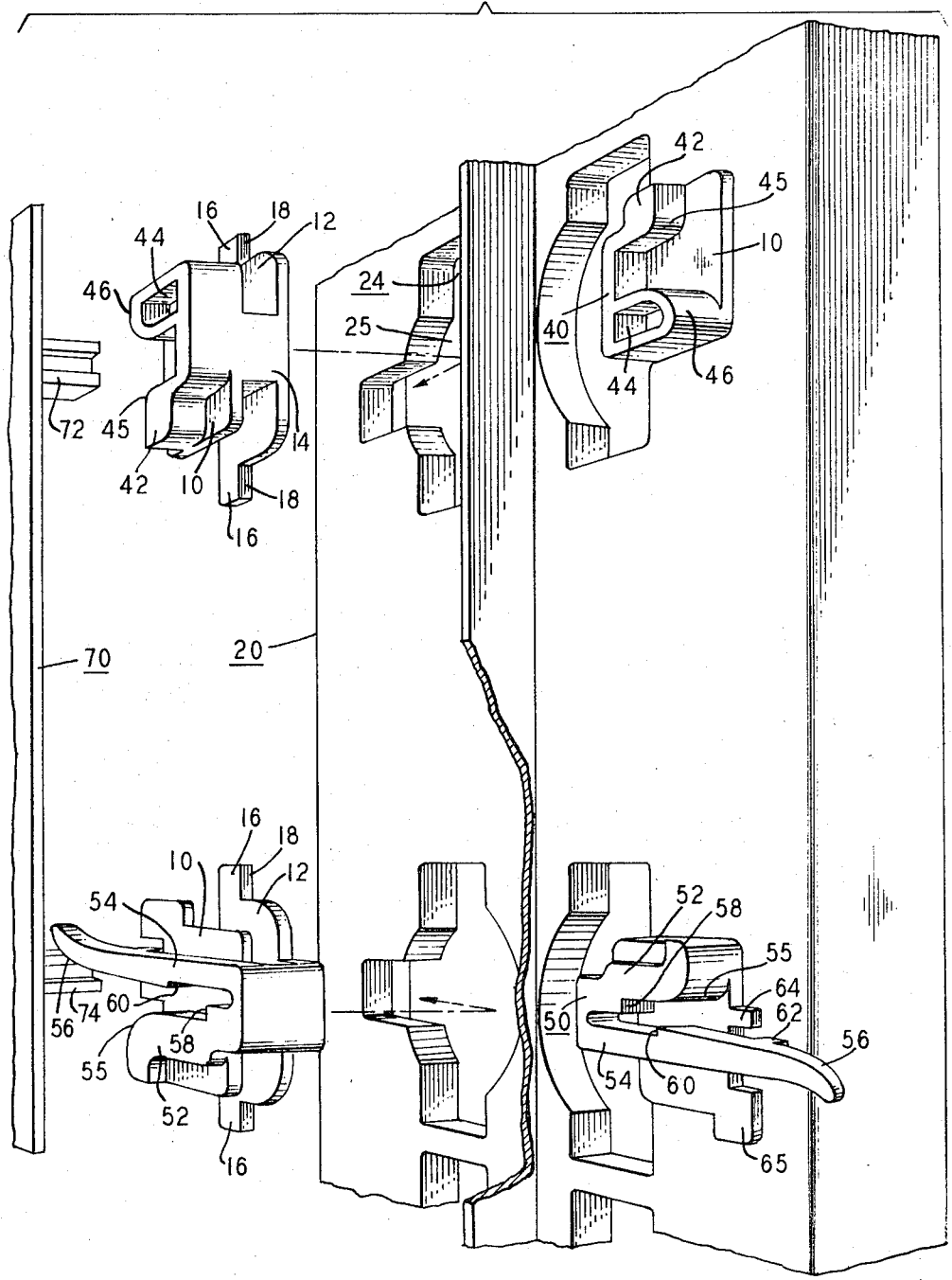
FIG. 2 is a left side perspective view of the two embodiments spaced from and mounted on the associated structural component.

Referring to FIGS. 1 and 2, both embodiments of this invention comprise a unitary member including a pair of spaced flanges 10 and 12 joined by a hub 14. The flange 12 has a pair of cantilevered latch fingers 16 extending in opposite directions therefrom and each latch finger has a stop surface 18.

These common elements of both embodiments interact with a structural component 20 that includes a wall 22 having an opening 24 consisting of an entry portion 25 and a mounting portion 26 extending from the entry portion. The mounting portion 26 has a slotlike configuration and is defined by opposing surfaces 26A and an end surface 26B. One surface of the wall 22 has a wedge-shaped boss 28 on each side of the mounting portion 26, and each boss comprises a ramp surface 30 inclined to the plane of the wall and a detent surface 32 orthogonal to the plane of the wall.

The common elements of each of the hardware embodiments bear a particular relationship to the wall 22 and the opening 24. The facing surfaces of the flanges 10 and 12 are spaced apart the same distance as the thickness of the wall 22 at the site of the opening 24, and the flange 12 has a configuration that is accommodated by the entry portion 25. In addition, the hub 14 is of a size to occupy the space between the opposing surfaces 26A of the mounting portion 26. Finally, the distance between the stop surfaces 18 of the latch fingers 16 and the oppositely facing end surface of the hub 14 is essentially the same as the distance between the detent surfaces 32 of the bosses 28 and the end surface 26B of the mounting portion 26.

With these relationships, the hardware is mounted on the structural component 20 by orienting the hardware so that the flange 12 is in juxtaposition with the entry portion 25 of the opening 24. The flange 12 is then moved through the entry portion 25 to a position where the flanges 10 and 12 straddle the wall 22, after which the hub 14 is moved into the mounting portion 26 so as to bring the latch fingers 16 into engagement with the wedges 28. As this movement continues, the latch fingers 16 are deflected by the ramp surfaces 30 of the wedges 28 and this deflection increases until the end surface of the hub 14 engages the end surface 26B of the mounting portion 26. The latch fingers 16 thereupon move beyond the ends of the ramp surfaces 30 and the latch fingers snap back to their undeflected position, moving the stop surfaces 18 of the fingers into engagement with the detent surfaces 32 of the wedges 28. As a result, the hub 14 is captured within the mounting portion 26 to support the hardware, while the flanges 10 and 12 embrace the wall 22 and the latch fingers 16 abut the wedges 28 to secure the hardware in place.

The functional portion of each hardware embodiment extends from the flange 10. In the embodiment shown in the upper portion of the drawing, the hardware comprises a guide, and as seen most clearly in FIG. 2, the functional portion consists of a U-shaped element 40 having legs 42 and 44. The legs 42 and 44 extend parallel to the plane of the flange 10 and transverse to the stop surfaces 18 of the latch fingers 16. The ends of the legs 42 and 44 curve away from one another to respectively provide lead-in surfaces 45 and 46.

In the embodiment shown in the lower portion of the drawing, the hardware comprises a latch and like the guide the functional portion consists of a U-shaped element 50 having the legs 52 and 54 extending parallel to the plane of the flange 10 and transverse to the stop surfaces 18 of the latch fingers 16. The leg 52 is rigid whereas the leg 54 is a flexible cantilever, the end of the leg extending beyond the adjacent edge of the flange 10. The ends of both legs 52 and 54 curve away from one another to respectively provide lead-in surfaces 55 and 56. In addition, the leg 52 has an arresting surface 58 extending transverse to the length thereof and the leg 54 has a catch surface 60 extending transverse to the length thereof, the catch surface facing and being spaced from the arresting surface. Finally, the leg 54 has a boss 62 extending laterally therefrom intermediate a pair of spaced tabs 64 and 65 on the flange 10, the boss and tabs serving to limit the deflection of the leg.

Referring to FIG. 2, the guide and latch cooperate with one another to secure a door 70 having a protruding rectangular guide bar 72 and a protruding rectangular latch bar 74 spaced the same distance apart as the guide and latch. The guide bar 72 is of a size to occupy the space between the legs 42 and 44 of the guide and the latch bar 74 is of a size to occupy the space between the arresting surface 58 and the catch surface 60 of the legs 52 and 54 of the latch.

As the door is closed, the lead-in surfaces 45 and 46 of the guide 55 and 56 of the latch interact with the guide bar 72 and latch bar 74, respectively, to direct door into the closed position. In addition, the leg 54 of the latch is deflected away from the leg 52 by the latch bar 74. This deflection continues until the latch bar 74 engages the arresting surface 58 of the leg 52 whereupon the leg 54 returns to its undeflected position and the latch bar is captured between the arresting surface and the catch surface 60 of the leg 54. The guide bar 72 is simultaneously captured between the legs 42 and 44 of the guide and the door is secured. To open the door, the leg 54 of the latch is manually deflected away from the leg 52 at the same time that the door is pulled outwardly from the guide and latch.

The hardware of this invention is advantageously molded from a thermoplastic material, the desired flexibility being obtained through the combination of structural design and the use of a material having the necessary flexural modulus.

Although three embodiments of the invention have been shown and described, it is understood that these are but illustrative and that various modifications may be made therein without departing from the scope and spirit of this invention, as defined by the appended claims.

What is claimed is:

1. Quick-mounting hardware for attachment to a structural component including a wall having an opening and a wedge-shaped boss on one side of the opening, the hardware comprising:

a support portion including a hub of a size to substantially occupy a particular portion of the opening;

a securing portion comprising a flange fixedly secured to each end of the support portion, one of the flanges being of a size to pass through the opening and the flanges being spaced-apart approximately the same distance as the thickness of the wall at the site of the particular portion of the opening, and at least one of the flanges including a cantilevered latch finger that snaps behind the wedge-shaped boss to secure the hardware in place when the hub is positioned within the particular portion of the opening; and a functional portion extending from the securing portion.

2. Quick-mounting hardware as in claim 1 wherein the opening in the wall comprises an entry portion and a mounting portion extending from the entry portion, and the one flange has a configuration to pass through the entry portion.

3. Quick-mounting hardware as in claim 2 wherein the mounting portion of the opening has a slotlike configuration defined by two opposing surfaces and an end surface and the hub is of a size to occupy the space between the two opposing surfaces.

4. Quick-mounting hardware as in claim 3 wherein the wedge-shaped boss comprises a ramp surface inclined to the plane of the wall and a detent surface orthogonal to the plane of the wall, and the latch finger includes a stop surface that is spaced from an oppositely facing end surface of the hub essentially the same as the distance between the detent surface of the boss and the end surface of the mounting portion of the opening.

5. Quick-mounting hardware as in claim 4 wherein the functional portion comprises a U-shaped element having legs extending parallel to the plane of the associated flange and transverse to the stop surface of the latch finger, and the ends of both legs curve away from one another.

6. Quick-mounting hardware as in claim 5 wherein one of the legs is a flexible cantilever extending beyond the adjacent edge of the associated flange.

7. Quick-mounting hardware as in claim 6 wherein each of the legs has a surface extending transverse to the length thereof and the two surfaces face and are spaced from one another.

8. Quick-mounting hardware as in claim 6 wherein the cantilever leg has a boss extending laterally therefrom and the associated flange has a pair of spaced tabs between which the boss extends.

9. Quick-mounting hardware as in claim 1 wherein the support portion, the securing portion, and the functional portion are integral with one another.

10. Quick-mounting hardware for attachment to a structural component including a wall having an opening consisting of an entry portion and a mounting portion extending from the entry portion, one surface of the wall having a wedge-shaped boss on each side of the mounting portion with the edge of the boss facing the entry portion, the hardware comprising:

a pair of spaced flanges fixedly joined by a hub, the hub being of a size to occupy the mounting portion of the opening, the flanges being spaced apart the same distance as the thickness of the wall at the site of the mounting portion of the opening, and one of the flanges having a configuration to pass through the entry portion of the opening and including a pair of opposed cantilevered latch fingers that snap behind the wedge-shaped bosses to secure the hardware in place when the hub is moved into the mounting portion of the opening; and a functional portion extending from the other flange.

* * * * *